United States Patent
Gates et al.

(10) Patent No.: US 10,482,410 B2
(45) Date of Patent: *Nov. 19, 2019

(54) ITEM HANDLING AND TRACKING SYSTEM AND METHOD THEREFOR

(71) Applicant: SITA INFORMATION NETWORKING COMPUTING USA, Inc., Atlanta, GA (US)

(72) Inventors: Nicholas John Gates, Hayes (GB); Manish Limaye, Kennesaw, GA (US); Olivier Pierre Poulard, Hayes (GB); Emad Eldeen Muhanna, Atlanta, GA (US); Daniel Edmond Chetrit, Atlanta, GA (US); Aseem Dayal, Atlanta, GA (US); Pravin Naicker, Atlanta, GA (US); Maria Patricia Maya, Atlanta, GA (US)

(73) Assignee: SITA Information Networking Computing USA, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,075

(22) Filed: Jan. 25, 2018

(65) Prior Publication Data

US 2018/0165617 A1    Jun. 14, 2018

Related U.S. Application Data

(63) Continuation of application No. 15/244,337, filed on Aug. 23, 2016, now abandoned, which is a
(Continued)

(51) Int. Cl.
*G06Q 10/06* (2012.01)
*G06Q 10/08* (2012.01)
*B64F 1/36* (2017.01)

(52) U.S. Cl.
CPC ......... *G06Q 10/0635* (2013.01); *B64F 1/368* (2013.01); *G06Q 10/08* (2013.01); *G06Q 10/0833* (2013.01)

(58) Field of Classification Search
CPC ............ G06Q 10/08; G06Q 10/00635; G06Q 10/0833; B46F 1/368
See application file for complete search history.

(56) References Cited

U.S. PATENT DOCUMENTS 5,313,052 A * 5/1994 Watanabe ............... B64F 1/366
235/375
5,748,850 A    5/1998 Sakurai
(Continued)

FOREIGN PATENT DOCUMENTS

DE    102009020228 A1    11/2010
EP       1308864 A1     5/2003
(Continued)

*Primary Examiner* — Patrick Cicchino
(74) *Attorney, Agent, or Firm* — Morris, Manning & Martin, LLP; Daniel E. Sineway, Esq.; Adam J. Thompson, Esq.

(57) ABSTRACT

In an airport baggage handling system bag information, flight information and airport topology information are provided to a central processor which determines a path for the bag through the handling system. The bag is scanned at various points along the path and the scan time is compared with a predetermined arrival time for the bag at the scan point. A bag is marked at risk if it arrives at a scan point after the predetermined time and the system may suggest an alternative handling path for the bag if it is determined that the risk of the bag not making an outbound flight is too high.

27 Claims, 13 Drawing Sheets

Related U.S. Application Data continuation of application No. 14/357,993, filed as application No. PCT/EP2011/070551 on Nov. 21, 2011, now Pat. No. 9,460,412.

(60) Provisional application No. 61/514,765, filed on Aug. 3, 2011.

(56) References Cited

U.S. PATENT DOCUMENTS

| | | | |
|---|---|---|---|
| 5,793,639 A | 8/1998 | Yamazaki | |
| 5,897,620 A | 4/1999 | Walker | |
| 6,044,353 A | 3/2000 | Pugliese, III | |
| 6,259,405 B1 | 7/2001 | Stewart | |
| 6,414,635 B1 | 7/2002 | Stewart | |
| 6,553,336 B1 | 4/2003 | Johnson | |
| 6,735,630 B1 | 5/2004 | Gelvin | |
| 6,736,322 B2 | 5/2004 | Gobburu | |
| 6,750,757 B1* | 6/2004 | Gabig, Jr. | G06K 7/10306 235/375 |
| 6,758,394 B2 | 7/2004 | Maskatiya | |
| 6,972,682 B2 | 12/2005 | Lareau | |
| 7,027,808 B2 | 4/2006 | Wesby | |
| 7,275,689 B2 | 10/2007 | Mak | |
| 7,486,171 B2 | 2/2009 | Kim | |
| 7,599,847 B2 | 10/2009 | Block | |
| 8,229,458 B2 | 7/2012 | Busch | |
| 8,467,726 B2 | 6/2013 | Shirakata | |
| 8,509,441 B2 | 8/2013 | Yoon | |
| 8,521,681 B2 | 8/2013 | Ouchi | |
| 8,631,358 B2 | 1/2014 | Louch | |
| 8,665,238 B1 | 3/2014 | Gossweiler, III | |
| 8,949,142 B1 | 2/2015 | Angrish | |
| 8,977,568 B1 | 3/2015 | Schattauer | |
| 9,024,752 B2 | 5/2015 | Tumayan | |
| 9,026,461 B2 | 5/2015 | Calman | |
| 9,047,512 B2 | 6/2015 | Otis | |
| 9,134,955 B2 | 9/2015 | Healey | |
| 9,141,325 B2 | 9/2015 | Dersy | |
| 9,239,246 B2 | 1/2016 | Jones | |
| 9,275,550 B1 | 3/2016 | Stefani | |
| 9,541,632 B2 | 1/2017 | Frank | |
| 9,552,564 B1 | 1/2017 | Martenis | |
| 9,589,262 B2 | 3/2017 | Graylin | |
| 9,589,405 B2 | 3/2017 | Cabouli | |
| 9,599,989 B1 | 3/2017 | Brown | |
| 9,710,920 B2 | 7/2017 | Utsunomiya | |
| 9,749,831 B2 | 8/2017 | Lee | |
| 2001/0032034 A1* | 10/2001 | Manabe | B64F 1/368 700/225 |
| 2002/0134836 A1* | 9/2002 | Cash | G06Q 10/08 235/385 |
| 2003/0141411 A1* | 7/2003 | Pandya | B64F 1/366 244/114 R |
| 2005/0258230 A1 | 11/2005 | Wiater | |
| 2006/0097046 A1* | 5/2006 | Baru Fassio | G08B 13/2462 235/385 |
| 2006/0111123 A1* | 5/2006 | Nerat | G06K 7/0008 455/456.1 |
| 2009/0015398 A1* | 1/2009 | Bhogal | A45C 13/18 340/539.13 |
| 2009/0259549 A1* | 10/2009 | Winand | G06Q 10/08 705/14.35 |
| 2009/0266882 A1 | 10/2009 | Sajkowsky | |
| 2010/0036522 A1* | 2/2010 | Stich | G06Q 10/08 700/226 |
| 2011/0267192 A1* | 11/2011 | Goldman | G06K 19/07 340/568.1 |
| 2012/0041313 A1 | 2/2012 | Tanaka | |
| 2014/0223043 A1 | 8/2014 | Dersy | |
| 2015/0360258 A1* | 12/2015 | Dadyala | B64F 1/368 209/552 |
| 2016/0152350 A1 | 6/2016 | Puentes | |
| 2016/0180255 A1 | 6/2016 | Goedemondt | |
| 2017/0004444 A1 | 1/2017 | Krasko | |
| 2017/0032263 A1 | 2/2017 | Yuan | |

FOREIGN PATENT DOCUMENTS

| | | |
|---|---|---|
| EP | 0770546 B1 | 12/2003 |
| EP | 2932902 B1 | 12/2016 |
| EP | 1872294 B1 | 11/2017 |
| JP | 2003157984 A | 5/2003 |
| JP | 2017129981 A | 7/2017 |

* cited by examiner

| Sequence | Global Baggage Process Activity List | LHR Type 1: T3 Arrival Excluding Air Canada & Singapore Airlines (5 AM to 5 PM) | LHR Type 2: T1 Arrival & T3 Arrival (Air Canada) | LHR Type 3: T3 Arrival - Singapore Airlines (5 AM to 5 PM) |
|---|---|---|---|---|
| 1 | Prepare for Unload | x | x | x |
| 2 | Unload Bag | x | x | x |
| 3 | Reclaim Bag | | | |
| 4 | Recheck Bag | | | |
| 5 | Screen Bag | | | |
| 6 | Input Bag (Inbound Terminal) | x | x | x |
| 7 | Sort Bag (Inbound Terminal) | x | x | x |
| 8 | Input Bag (Outbound Terminal) | o | o | o |
| 9 | Sort Bag (Outbound Terminal) | o | o | o |
| 10 | Preload Bag | o | o | o |
| 11 | Load Bag | x | x | x | x  Mandatory Activities
o  Optional Activities

FIG. 3

ITEM HANDLING AND TRACKING SYSTEM AND METHOD THEREFOR

CROSS-REFERENCE TO RELATED APPLICATIONS

This patent application is a continuation of and claims the benefit of and priority to U.S. Non-Provisional patent application Ser. No. 15/244,337, filed Aug. 23, 2016, and entitled "Item Handling and Tracking System and Method Therefor," which is a continuation of and claims the benefit of and priority to U.S. Non-Provisional patent application Ser. No. 14/357,993, filed Feb. 16, 2015, and entitled "Item Handling and Tracking System and Method Therefor," which is a U.S. national phase application of International Patent Application No. PCT/EP2011/070551, filed Nov. 21, 2011, entitled "Item Handling and Tracking System and Method Therefor", by Nicholas John Gates et al. under 35 U.S.C. § 371, which claims the benefit of and priority under 35 U.S.C. §§ 119, 120 to U.S. Provisional Patent Application Ser. No. 61/514,765, filed Aug. 3, 2011, entitled "Item Handling and Tracking System and Method Therefor", by Emad Eldeen Muhanna et al., the disclosures of which are incorporated herein by reference as if set forth herein in their entireties.

FIELD OF THE INVENTION

This invention relates to item handling and tracking methods and systems. It is particularly, but not exclusively, concerned with baggage handling methods and systems, for example operating at airports, ports and other travel termini.

BACKGROUND TO THE INVENTION

Baggage performance has been elevated to very high priority in the majority of airlines. The Air Transport Industry transports some 2.25 billion bags annually. While 98% of all bags reach their destination at the same time as the owner, the 2% mishandled bags have been receiving increasingly negative press coverage and passenger complaints are on the rise. USA Department of Transport statistics indicate an 83% increase in mishandled baggage over the last 5 years, up to 7.3 mishandled bags per 1000 passengers. These figures are better looking than the reality because they exclude mishandled bags complaints where the passenger was inbound on an international flight.

In Europe, the Association of European Airlines reports 16.6 mishandled bags per 1000 passengers, a 21% increase over 3 years. The direct costs to airlines are substantial, estimated at nearly $4 billion annually, out of which transfer bags account for over 50% due to mishandlings.

It is, therefore, crucial to understand what happens during a bag transfer process at an airport to attempt to prevent the mishandling of a bag. Each bag has a determined standard path based on the airport topology, airport rules (such as type of connection involved), the agreement between airlines involved and the locations (i.e. terminal and gate/aircraft parking stand) of the arrival flight (inbound) and the connecting departure flight (outbound).

FIG. 1 shows a typical baggage transfer process at an airport. The bag goes through consecutive tasks (including for example but not limited to unload, induction and sorting at inbound or outbound transfer facilities, screening, load into cart or Unit Loading Device (ULD) and final load onto the outbound aircraft) with some "checkpoints" before or after each of the task involved.

At these checkpoints, many local systems are capable of sending Baggage Processed Messages (BPM) via Baggage Handling Systems (BHS).

Thus in FIG. 1 a bag is shown as going through 7 distinct stages labelled 1 to 7. At stage 1 a bag arrives on an inbound flight 10, is unloaded and handled by a baggage handling agent BHA 12 and delivered by trolley to stage 2. The time of arrival of the bag at stage 1 can be recorded at stage 1, and other stages which involve baggage handling agents and baggage transfer agents as indicated by the stopwatch in the figure. At stage 2 the bags are delivered by the baggage handling agent to a interline bag transfer agent IBTA 14 whose responsibility is to ensure that bags are received at the inbound terminal and successfully delivered to the outbound terminal for a connecting flight. The time of arrival at the IBTA is recorded. At this point the bags may have to be retrieved by passengers and taken through immigration and customs (I&C) 16 before being passed back to the IBTA at stage 3. The time at which the bags are received back is also recorded. While the bags are under the authority of the IBTA, the process flow can be monitored at a bag transfer management back office 18 under the authority of an interline bag transfer supervisor IBTS 20 who has access to real time data relating to the time taken between each of the stages as represented by dashboard 22 in FIG. 1 and who can generate statistical data relating to baggage handling as represented by chart 24 in FIG. 1. The IBTA is responsible for delivering the bags to the outbound terminal. Stage 4 is the arrival of those bags at the outbound terminal which again is timed. The bags are then required to pass through security checks shown as stage 5 airport security AS 26 and then proceed to stage 6 where they are delivered back to the baggage handling agent 12 for loading onto the outbound flight 28 at stage 7. Both stages 6 and 7 are timed.

FIG. 1 shows the process in a typical airport. Of course problems arise when a bag is lost or misrouted. There are many known systems capable of monitoring where a bag is last seen. However the determination of Hot Bag (i.e. a bag at risk) is usually manual. Although some Baggage Reconciliation Systems can determine whether some bags are hot bags, they provide such information on a bag enquiry basis. These known systems are purely reactive.

Some airlines have developed systems which track their own bags very well, even possibly raising some alerts, but these systems only process connecting bags to and from the same airline. Those systems are incapable of dealing with interline bags (where the inbound airline is different from the outbound airline in a connection).

Thus those responsible for the baggage transfer process have to rely on their knowledge and experience to identify and deal with problems occurring on interline transfers and take appropriate actions based on other information coming from other systems such as Flight Information Display Systems (FIDS) and generally allocate someone to a task using a Resource Management System (RMS).

Moreover, although the airlines or their handling agents know the reasons why bags are usually mishandled, it is difficult for them to report on the specific reason for mishandling any given bag which makes the identification and solving of specific problems difficult.

There is a real need of a solution capable of gathering all the rules applicable to the transfer process at airports in order to determine automatically and intelligently whether a bag is at risk of missing its connection. Whenever such bag is flagged at risk, depending on the risk, an alternate path may be suggested to expedite the bag to its intended connecting flight.

A locally mishandled bag may still be reconciled with its owner on time by reflighting the bag. This involves making the bag travelling without its owner/passenger to the final destination of the passenger. To enable reflighting it is important to flag a bag as mishandled as soon as possible otherwise the bag cannot be sent to its destination in time to be picked up by the passenger.

We have appreciated that although this type of baggage mishandling may be avoided or mitigated by improving local processes and procedures, it is as important for a baggage handling system to be able to understand why a bag has been mishandled. Existing solutions are not capable of such understanding and it is therefore an aim of the invention to provide a system that addresses this problem.

Although this problem has been explained in the context of baggage handling it applicable to any logistics process in a hub-and-spoke model, involving the transfer of an item (such as cargo, parcel or mail) which has to go through consecutive tasks with checkpoints and where the items may be at risk of not being delivered to the destination on time.

SUMMARY OF THE INVENTION

According to an aspect of the invention there is provided a method of tracking the passage of items from an arrival point to a departure point in a hub and spoke item handling system, comprising the steps of: acquiring information about the identity of the items, the arrival and departure parameters for the item and the topology of the location through which the item may pass between arrival and departure; for each item, defining a path though the handling system from a plurality of valid paths and storing details of that path, the path including a plurality of checkpoints at which the item is identified and recorded; at each checkpoint, determining a status of each item based on the time of arrival of each item at the checkpoint compared to a target time of arrival, the items each being assigned one of a plurality of statuses including an indication of whether the item is at risk of not arriving at the departure point by a required time; where an item is assigned an at risk status, determining an alternative path through the system, and communicating the alternative path to a controller; and the controller determining whether to route the item via the suggested alternative path.

Embodiments of the invention may operate to identify bags that are at risk of mishandling.

In addition to providing a mishandling reason for a single bag, embodiments of the invention are also capable of providing aggregate reports that can identify to an airline or their handling agent bottle necks in their baggage handling process. For example in a particular airport such as London Heathrow, bags may be mishandled at a very high rate between point A & B on Wednesday's during Shift X. This is an important benefit of the system in that it allows improved data mining.

The items may comprise baggage and the location may be an airport. The arrival point is the arrival of an item of baggage on an incoming flight and the departure point is the departure of the item of baggage on an outbound flight, wherein each item of baggage has a unique identifier, and wherein the determining the status of each item comprises scanning the unique identifier at one of a plurality of scan locations and comparing the time at which the item is scanned to a time at which the item is expected to be scanned at that scanning location.

The unique identifier for each item of baggage may comprise origin and destination airport codes and the arrival and departure parameters comprise scheduled, estimated and actual flight arrival and departure times, arrival and departure gates. The topology of the location may comprise the topology of the airport and the step of defining a path through the handling system comprises selecting a path from one of a plurality of stored possible paths through the airport baggage handling system, each path having been defined by identifying and listing the process activities required to transfer the item of baggage from an arriving flight on a first airline at a first location at the airport to a departing flight on a second airline at a second location at the airport and assigning and assigning an average time for transit between activities for each path.

Embodiments of the invention have the advantage that a bag or other item can be determined to be at risk of missing a departing flight or other event and a suggestion for an alternative path for the bag can be made which may be acted on by a system operator. This enables airlines and baggage handlers, or operators of other item handling systems, to reduce the number of mishandled items.

Preferably, the risk status assigned to an item of baggage is one of a plurality of risk statuses each indicating a different likelihood of the item of baggage failing to arrive at the departure point before the departure time. A recovered status may be assigned to a bag when a subsequent checkpoint indicates that the bag is no longer at risk. For each item of baggage for that flight having an at risk status between the arrival and departure points, a further status may be assigned after departure of the flight indicating whether or not the item was loaded onto the flight. The further status may indicate that the item was loaded onto the flight, and indicate whether or not there was any intervention in the passage of the item through the baggage handling system. The further status may be recorded for subsequent analysis.

The invention also provides a system for tracking the passage of items from an arrival point to a departure point in a hub and spoke item handling system, comprising: an item processor for acquiring and processing information about the identity of the items; an arrival and departure processor for acquiring and processing information about the arrival and departure parameters for the item; a rules engine operating on a topology of the location through which the item may pass between arrival and departure to define a plurality of paths through the location and for selecting one of the plurality of paths for a given item; a store for storing item identity data provided from the item processor, arrival and departure parameters provided from the rules engine, and location topology information including the plurality of paths; a user application for communicating data relating to arrival and departure parameters and items to a system user; and a plurality of checkpoints arranged along the paths, each checkpoint including a scanner for scanning items to provide item identity and time of arrival information to the rules engine to determine a status of each item based on the time of arrival of each item at the checkpoint compared to a target time of arrival, the items each being assigned one of a plurality of statuses by the rules engine including an indication of whether the item is at risk of not arriving at the departure point by a required time; wherein when an item is assigned an at risk status, the rules engine determines an alternative path through the system, and communicates the alternative path to the user.

Preferably, a status agent communicates with the store and the rules engine for receiving item identity information updates and arrival and departure parameter updates from the rules engine and communicating those updates to the store.

The invention also provides a method of tracking the passage of items from an arrival point to a departure point in a hub and spoke item handling system, comprising the steps of: defining a set of configuration data comprising a set of paths an item may take from the arrival point to the departure point, a set of processes an item must undergo in each path, each process comprising at least one step and an item scan to determine the identity of the item and the time at which it is scanned, and a set of transits for each path, each transit comprising a start and an end scan point, an average time between the start and end scan points and the position of the transit in the path; for each item passing through the system, acquiring event information relating to the item, the event information relating to the identity of the item, item scans, and its arrival and departure; in response to event information, determining at a processor whether an item is at risk of failing to arrive at the departure point by a predetermined time and for any item determined to be at risk; and if an item is determined to be at risk, assigning a different path having different transits to the item.

Preferably, the items are items of baggage, the arrival point is a flight arrival at an airport and the departure point is a flight departure from the airport, and wherein item event information is provided as baggage information messages which are converted to baggage events and arrival and departure data is provided as flight information message which are converted to flight events. The baggage events and flight events being processed by a rules engine. Flight information messages may be provided as a continuous stream and comprise flight creation messages for new flights and flight update messages for amendments to existing flights. Baggage information messages may be received as a continuous stream and a status assigned to active bags that relate to an active inbound and outbound flight, each active bag having a bag operation process and a specified path.

BRIEF DESCRIPTION OF DRAWINGS

Embodiments of the invention will now be described, by way of example only, and with reference to the accompanying drawings, in which:

FIG. 3 is a table showing how activities can be mapped for activities within a particular airport;

Figure 1:
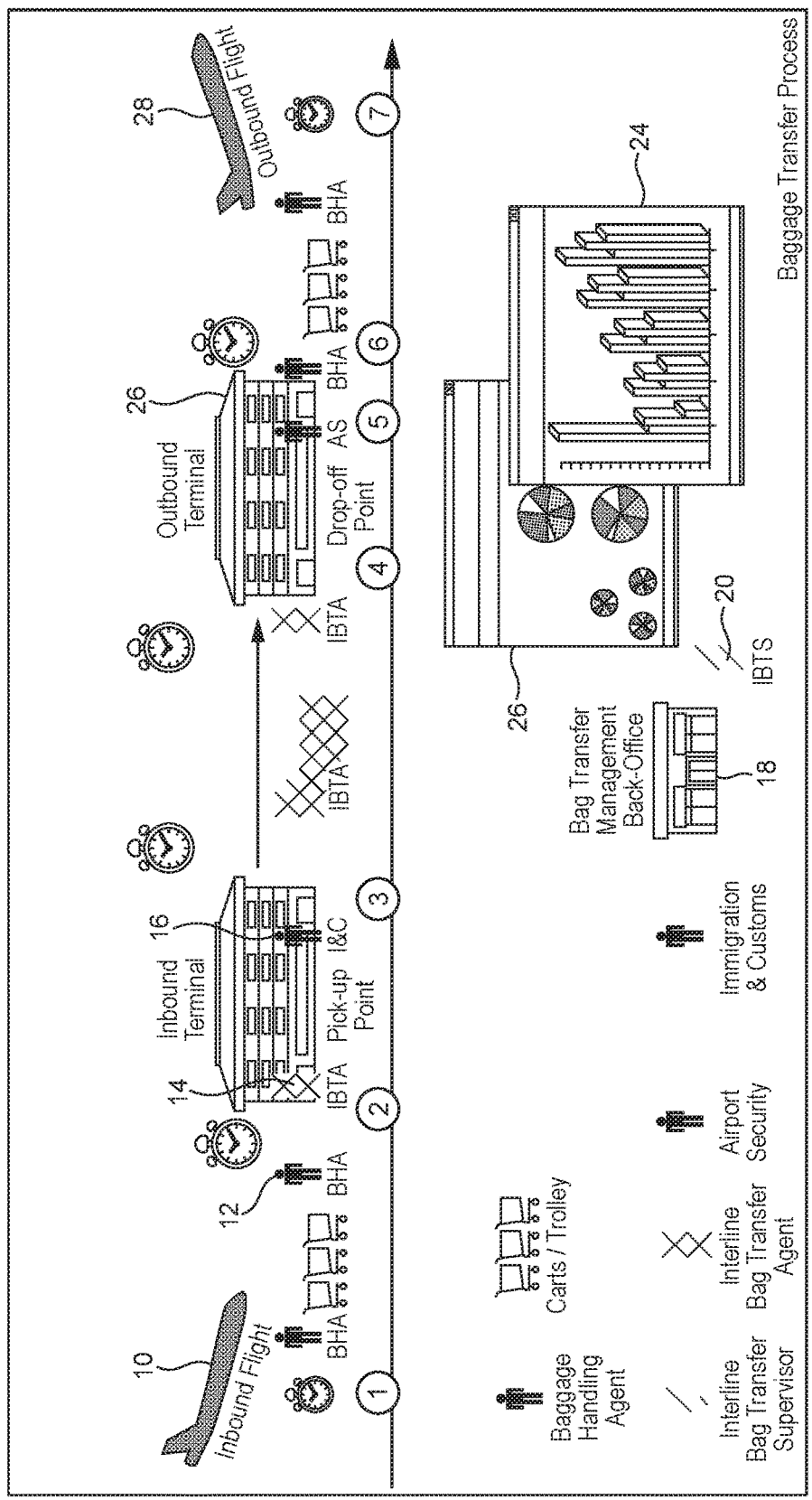
FIG. 1 (referred to above) shows a typical baggage flow through an airport when a bag is transferred from one airline to another.
Figure 2A:
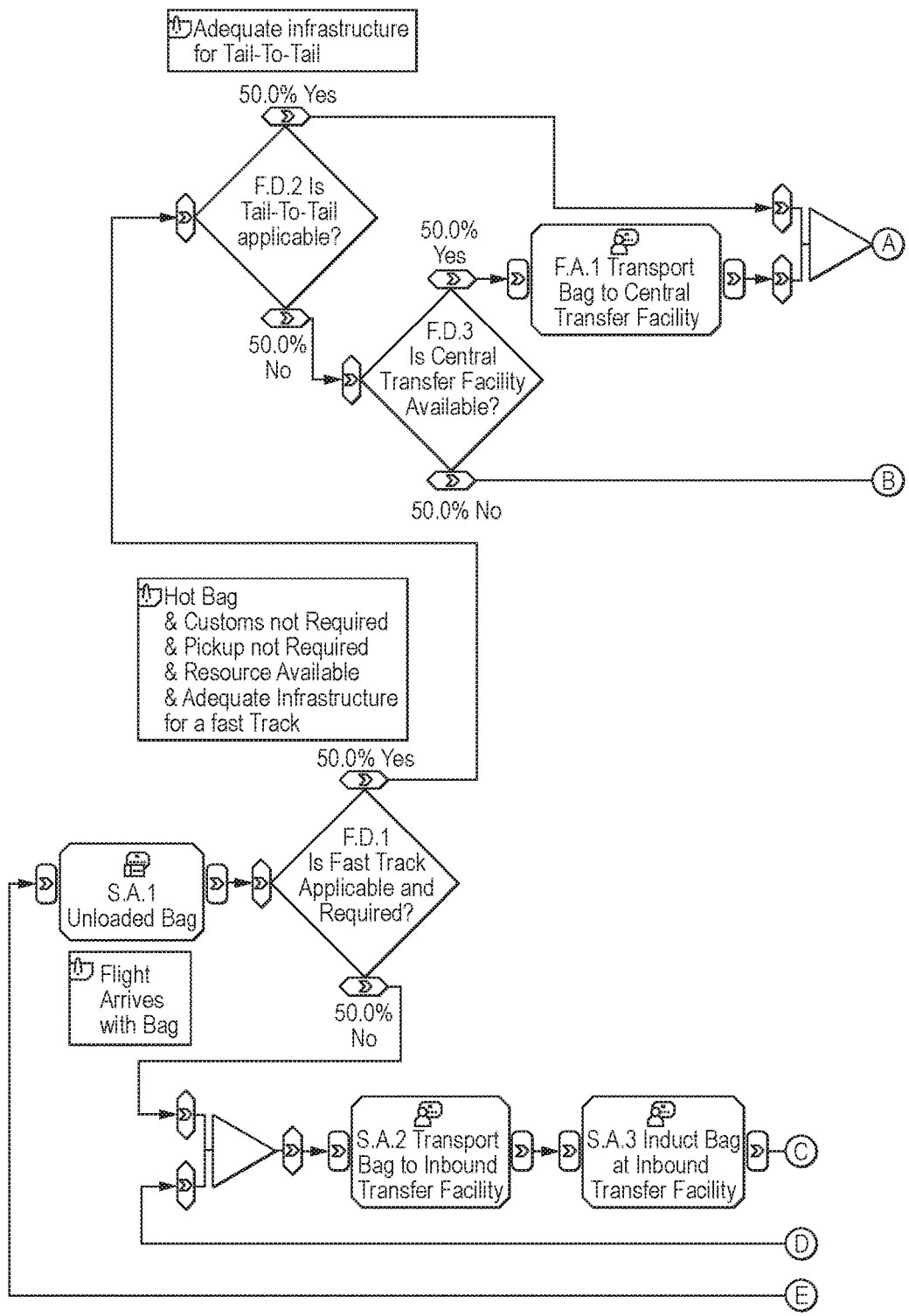
FIGS. 2 a to g show a process diagram for the baggage handling process in an airport.
Figure 2B:
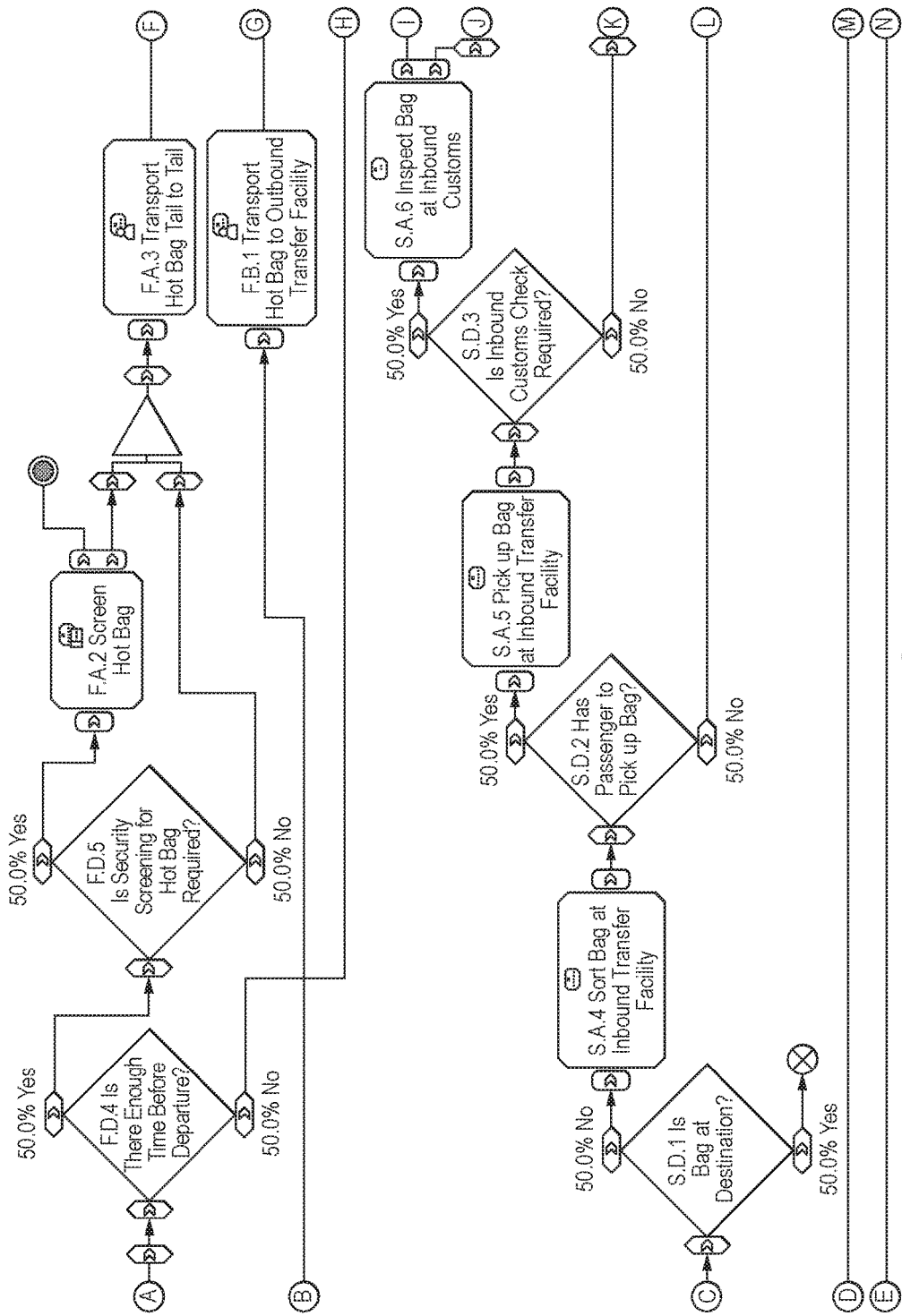
Figure 2C:
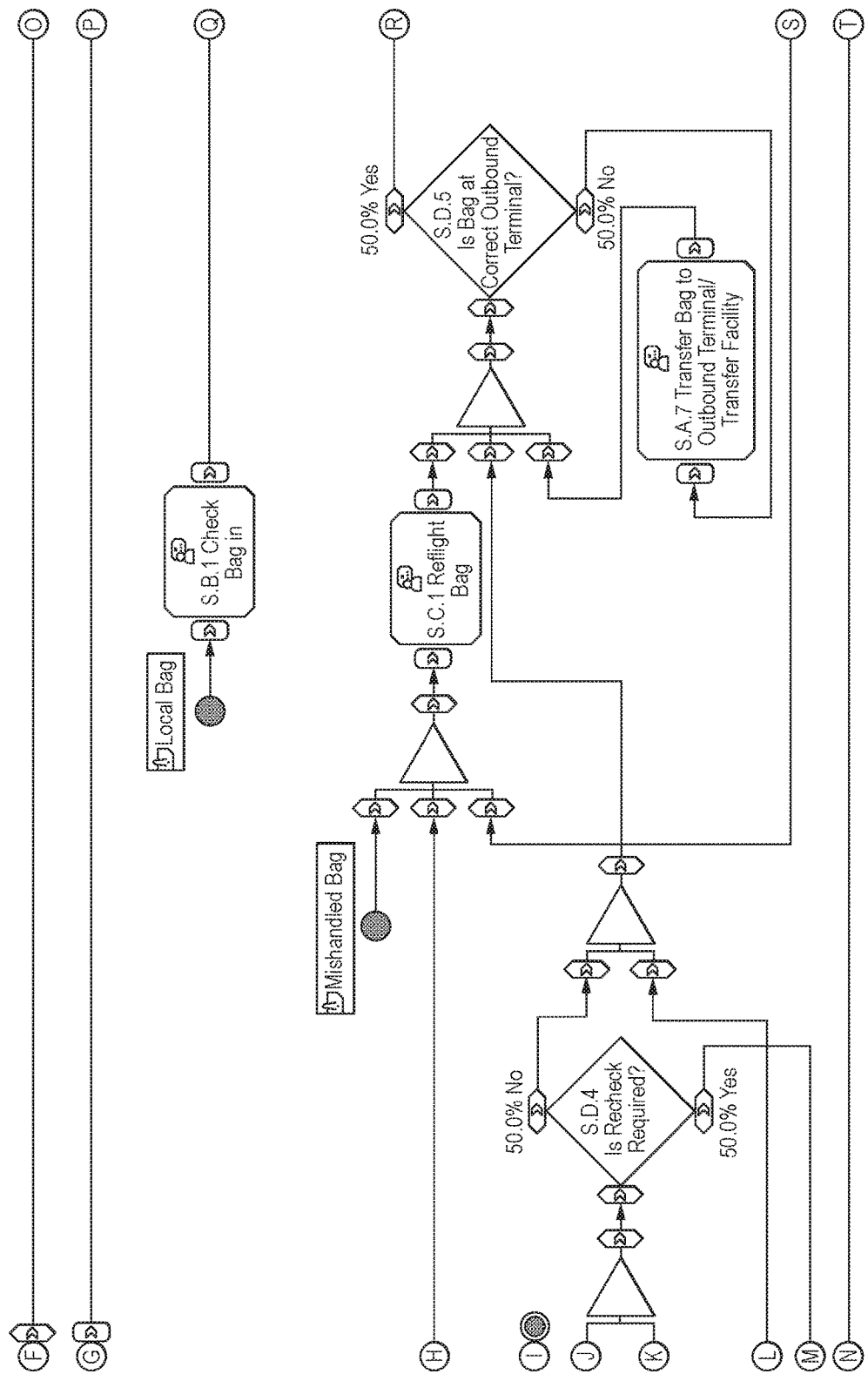
Figure 2D:
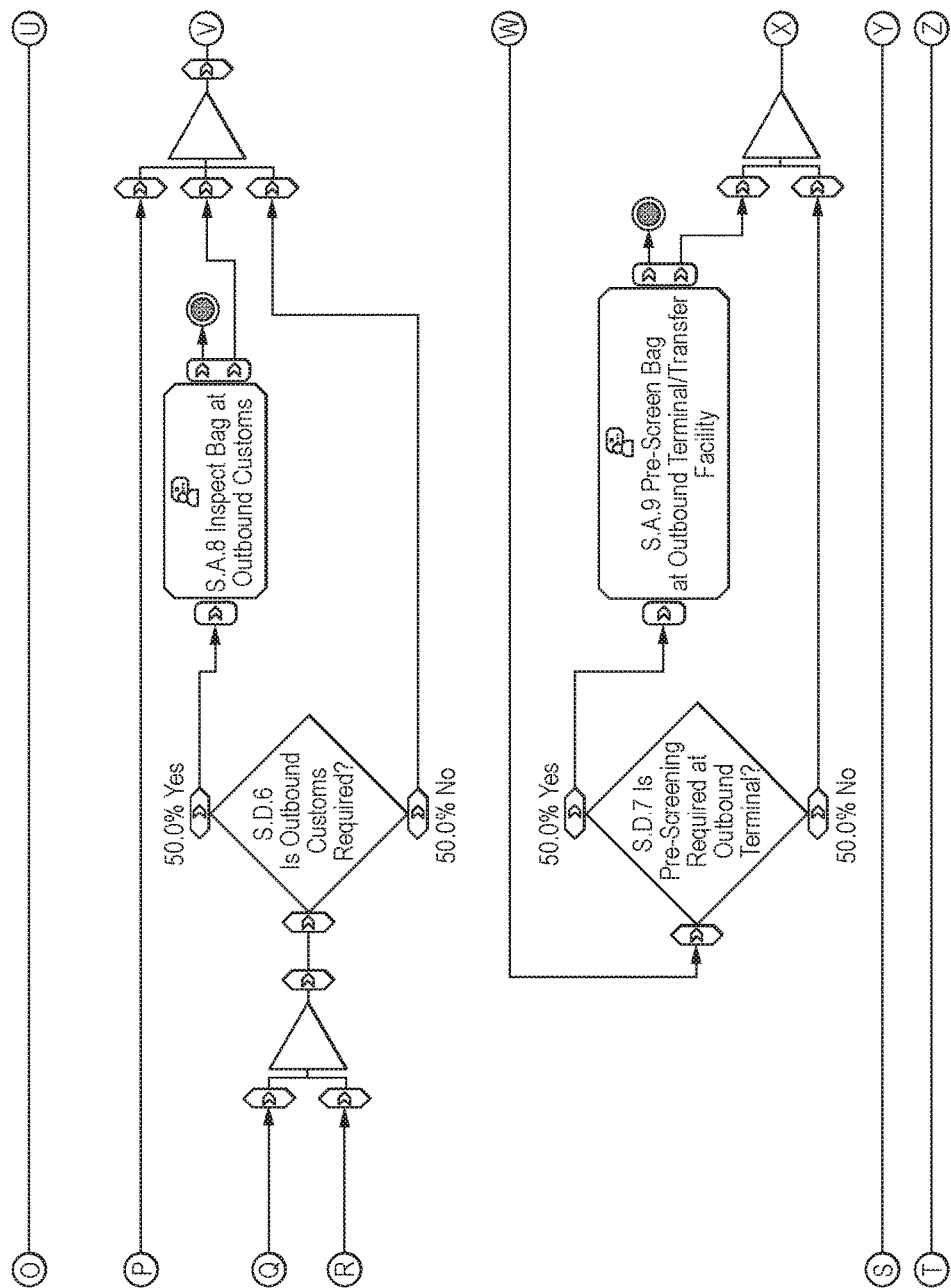
Figure 2E:
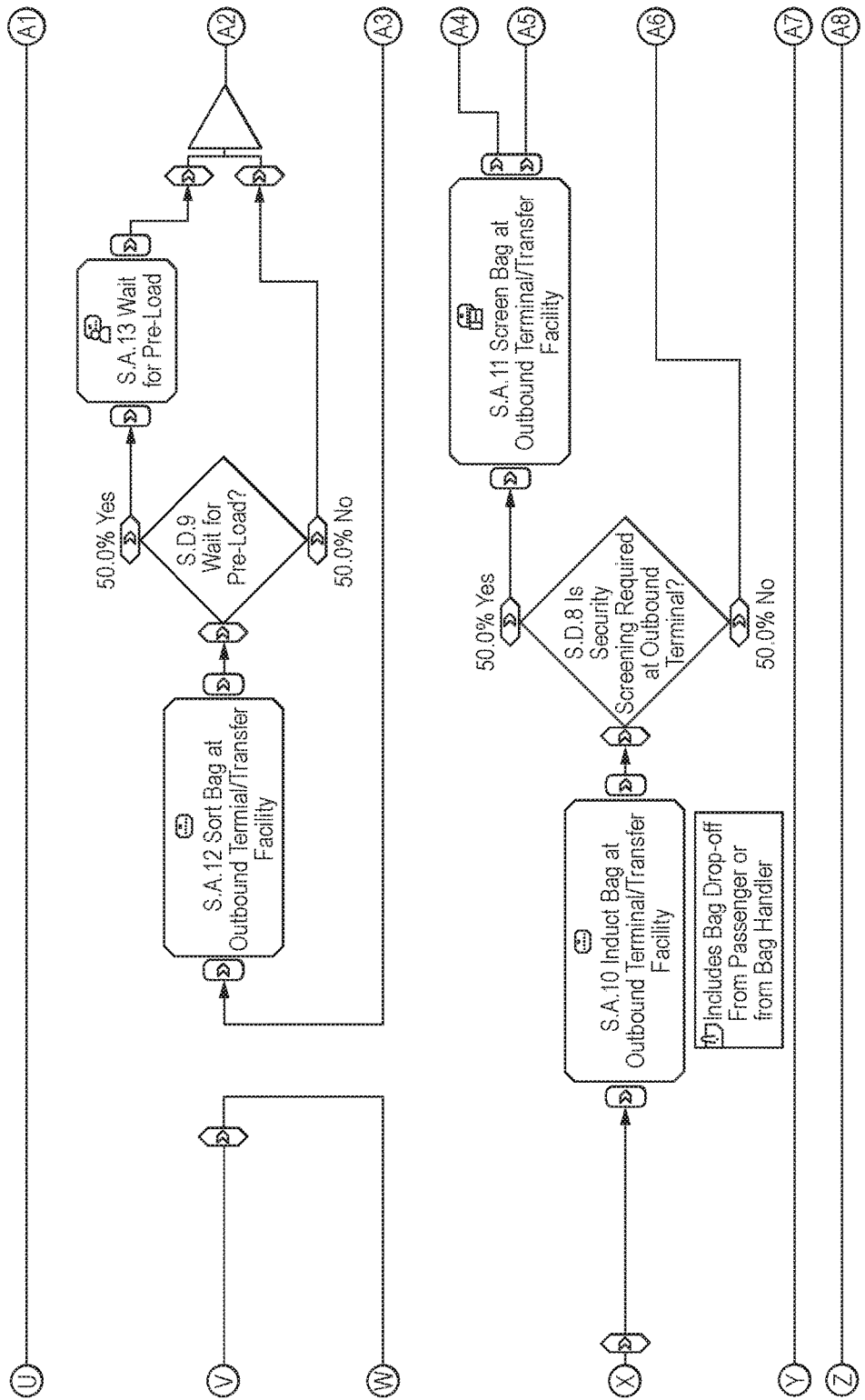
Figure 2F:
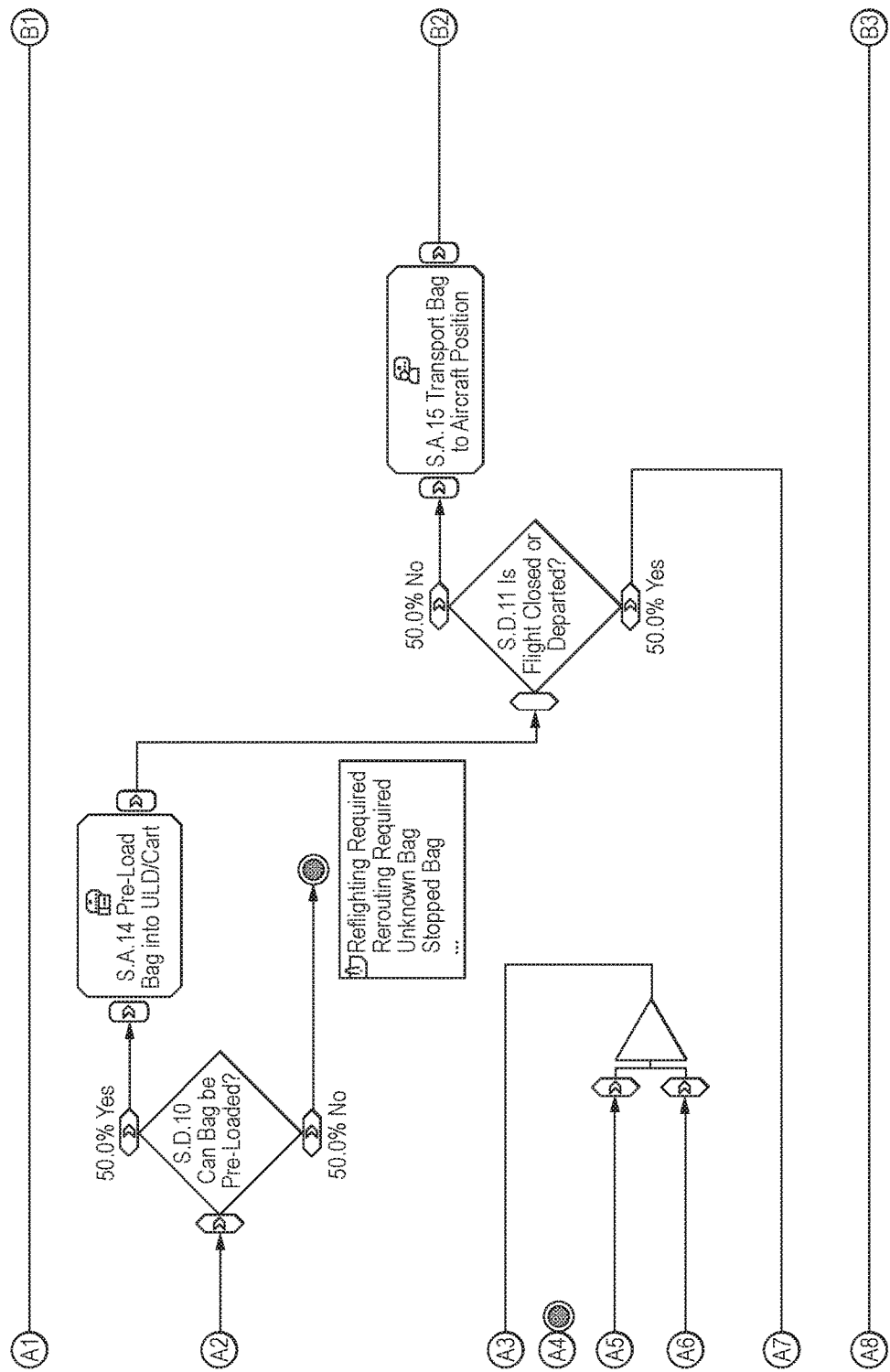
Figure 2G:
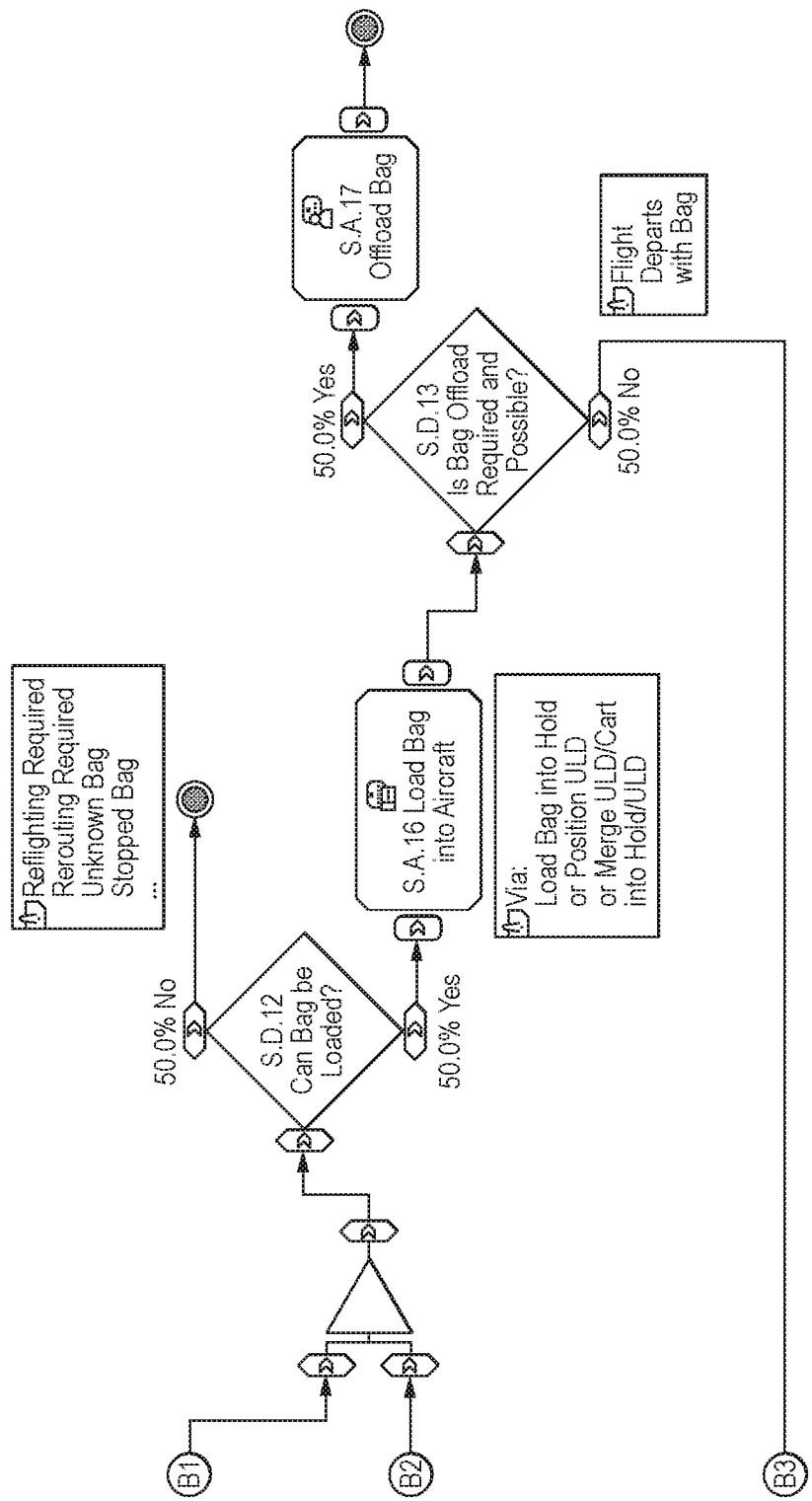

The system to be described enables items to be tracked from their arrival at the tracking and handling system to their departure. Although the following description relates to bags or baggage handling and tracking in an airport, it is to be understood that the method and system of the present invention is not limited to airport baggage handling but may be applied to any hub and spoke item tracking and handling, including, but not limited to, mail, cargo and parcels. The system operates to identify bags that are at risk of mishandling rather than waiting for mishandling to occur and then trying to react and respond to it. In order to identify at risk bags the system must have information external to the system which may affect bag handling, information about the bag itself and information about the path the bag must take, in this case the airport. Thus the system requires the following information:

1. Information about bags to be tracked.

The system requires information on all expected bags in advance, as well as progress of those bags as they move at transfer airport. This information includes:

a) A unique bag identifier at an airport.

This identifier is referred to as a ten digit LPN (License Plate Number) in the baggage industry. An example of tag number is 0125111111. A tag number has three components: The first digit, 0 in the given example, indicates tag type; digits 2-4 shows a numeric code for tag airline, and last 6 digits are a running number.

b) Inbound and Outbound flight information.

Airline code & flight number (such as UA123), origin and destination airport code (such as ATL to ORD), and scheduled flight date (such as 12 May).

2. Flight information

This data includes scheduled, estimated and actual time of arrival and departure for flights, terminal, gate or stand information, and status of flight information.

3. Airport topology

This data includes airport layout (terminal, gates), bag operation processes, valid paths for each bag operation process, airline and airport rules. This will be unique to each airport at which the system is running.

Constructing an airport topology and identifying bag operation processes along with valid paths is a multistep complicated task. At a very high level, the overall baggage operation process contains the following activities:

(i) Unload;
(ii) Induction into arriving transfer facility;
(iii) Optional security screening or EBS (Early Bag Storage);
(iv) Optional customs clearance;
(v) Optional induction into outbound terminal;
(vi) Preload; and
(vii) Load in aircraft.

FIG. 2 shows the overall baggage operation process excluding the optional EBS.

Each airport is different and may not require all activities. The first step is to record an average time for each applicable step and activity. A number of activities is required to complete the transfer process varies based on various factors such as the arriving and departing airline, flight, terminal, transfer type, time of the day etc. The transfer type can be one of the following six values:

1. International to International,
2. International to Domestic,
3. Domestic to International,
4. Domestic to Domestic,
5. Transborder to International, and
6. Transborder to Domestic.

The result of the airport topology analysis is the identification of all such bag operation processes.

FIG. 3 shows a table which is an exemplary mapping of activities for London Heathrow (LHR) airport. Twelve possible activities are identified and shown in the column 'Global Baggage Process Activity List' in the order in which they are to be performed. The activities are 'Prepare for Unload'; 'Unload Bag'; 'Reclaim Bag'; 'Recheck Bag'; 'Screen Bag'; 'Input Bag (inbound terminal)'; 'Sort Bag (inbound terminal)'; 'Input Bag (outbound terminal)'; 'Sort Bag (outbound terminal)'; 'Preload Bag'; and 'Load Bag'. The three columns on the right of the table indicate which of these activities are mandatory or optional for three flight types. Mandatory activities are indicated by an X and optional activities by an O. Thus, the first of the three column lists the activities for a flight arriving at Terminal 3 between 5 AM and 5 PM excluding Air Canada and Singapore Airlines flights. The second column shows the activities for Singapore Airlines flights arriving at Terminal 1 or 3, and the third column indicates activities for Singapore Airlines flights arriving at Terminal 3 between 5 AM and 5 PM. Taking the first column as an example, the activities 'Prepare for Unload', 'Unload Bag', 'Input Bag (inbound terminal)', 'Sort Bag (inbound terminal), and 'Load Bag' are mandatory and must be performed. The activities 'Input Bag (outbound terminal)', 'Sort Bag (outbound terminal)', and 'Preload Bag' are optional and may be performed.

Having defined the activities for an airport, the next step is to construct automatically all valid paths for a process along with the required time by looking at mandatory and optional activities. Some of the paths, even though theoretically correct, may not make sense for real world operations and are manually removed by an airport administrator during the validation process. Valid airline pairs must be configured as must be a hot threshold parameter for each airport and airline. This threshold is the point at which a bag is considered at significant risk of missing its connecting flight. The airport topology definition in then complete.

The system now uses this information along with bag and flight feed data to identify bags at risk and to give a proper suggestion as to how the bag can be handled to ensure that it is delivered to its connecting flight safely and on time. Before describing how this works, status and problem terms related to bags must first be defined.

A bag can have the following status:
1. Cold—the bag is not at risk;
2. Warm—the bag is not on schedule at a specific read location and it does not follow the standard path (in terms of expected timings) requiring an alert to be raised;
3. Hot—the bag is highly at risk of missing its connecting flight;
4. Critical—the bag is very highly at risk of missing its connecting flight; and
5. Cool—a bag, which used to be at risk, is now Cold (i.e. back on track)

As discussed below, in certain at risk statuses, further status may be assigned to enable the system to monitor how it has responded to the perceived risk of mishandling.

The core of the system logic defines for each bag a forward path, from the moment the inbound flight arrives, and a backward path, from the last estimated time of departure of the outbound flight backwards, to determine the current bag status and problem encountered. A knowledge of whether a bag is at the correct point in its scheduled path helps to understand the category of problem that is encountered by a bag at the airport. According to the forward path, the bag should be at certain checkpoints along the path at certain times. These are scanning or read locations where the bag license plate number is read. When the bag is not detected or is detected later than anticipated by the forward path calculation it may be at risk of missing its connecting flight.

The system may identify and define five main problems
1. Bag not Seen
   a bag is not yet seen at an expected Read Location in the scheduled path.
2. Bag Late
   a bag is seen Late at an expected Read Location in the scheduled path.
3. Bag Unexpected,
   a bag is seen at an unexpected Read Location, being a Read Location known to the system but not in the scheduled path for the bag.
4. Passenger Rerouted
   a passenger is rerouted to a new flight with bag categorised as at risk in the new scheduled path. This aims to prevent loading of the bag onto the wrong flight.
5. Bag Deleted
   a bag at risk has been deleted and will not travel on its original flight. This is abnormal through the transfer process and aims to prevent the bag being loaded onto the original flight.

Whenever a bag is given the status of Hot or Critical, the system makes an intelligent suggestion of an alternative path which is given to the user who can decide to record that suggestion or record his own decision.

It is important to be able to monitor the ability of the system to rescue bags which have been labelled at risk. When each outbound flight departs, the status for all the expected bags which were once at risk becomes is changed to one of:
1. Saved Bag,
   the bag is found onboard with at least one intervention of someone according to the decision history for the bag;
2. Miracle Bag,
   the bag is found onboard without any intervention.
3. Mishandled Bag,
   the bag has been left behind on the ground or put onto the wrong flight.

It will be appreciated that these additional three statuses are only assigned to bags which had previously been assigned to the hot or critical statuses. This final status may be re-evaluated if further load/offload messages are received up to a few hours after the flight departs. The system repository or store can then be used to produce reports detailing the reasons for bags being mishandled based on the alerts raised and bag/flight messages received in conjunction with data held in a baggage tracing system.

The risk of mishandling is greatly increased by a change of gate/aircraft parking stands. As the system receives live information about flight status which includes gate/stand information, the system can warn about such changes and generate alerts related to change of schedule of inbound flights.

Figure 4:
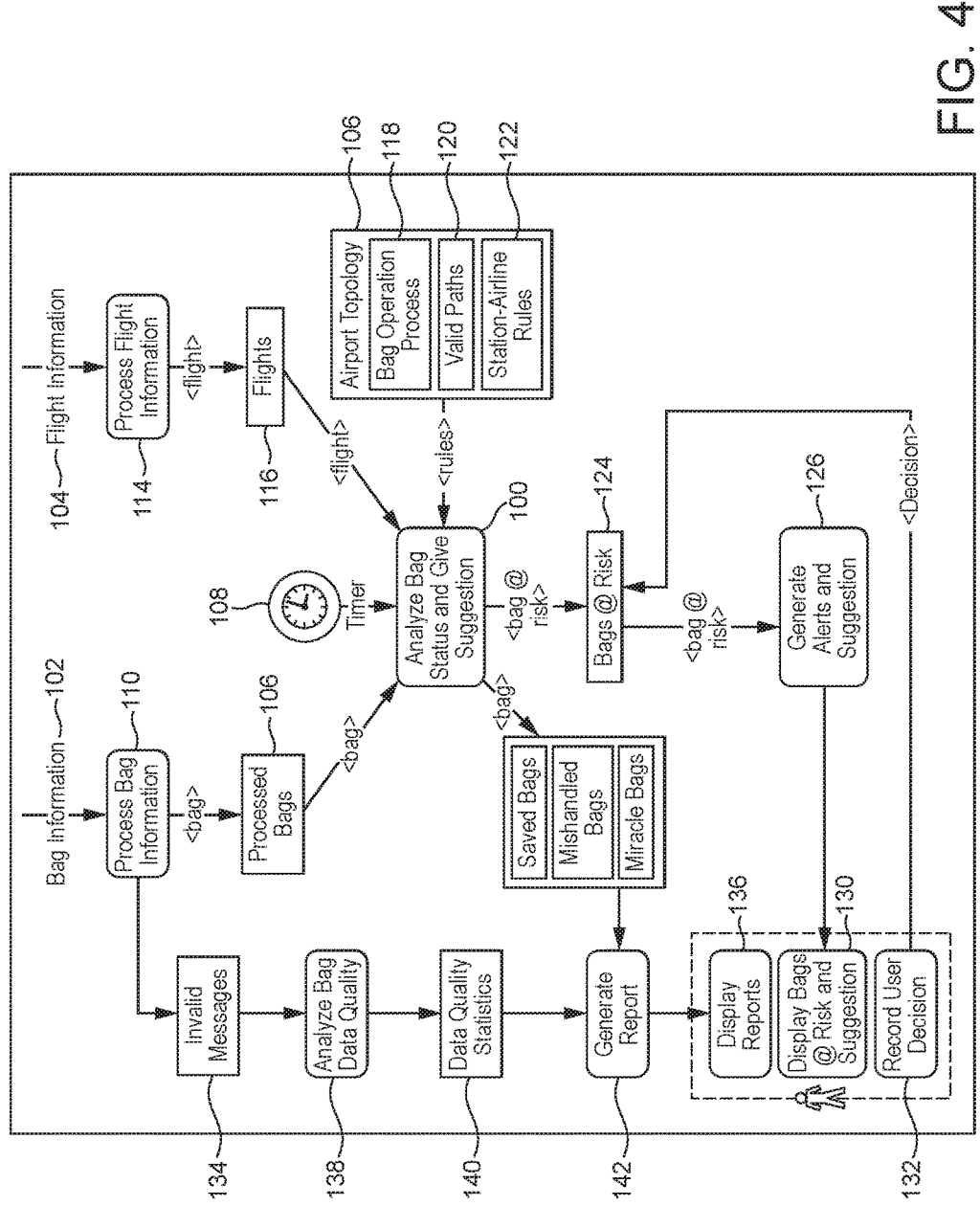
FIG. 4 is a logical diagram of a system embodying the invention.

Having described the process performed by an embodiment of the invention, the implementation of that process will now be described with reference to FIGS. 4 to 7. FIG. 4 shows the logical architecture of the decision support system engine which aggregates bag, flight information and airport topology and then applies an algorithm for identifying bags at risk and suggesting alternative paths to return a bag at risk to a cool state in which its handling is in accordance with a predetermined path. In FIG. 4, the process 'analyse bag status and give suggestion' 100 receives inputs from three processes: 'bag information' 102, 'flight information' 104 and 'airport topology' 106. Process 100 also receives inputs from a timer 108 which is used to determine whether a bag passes through each reading point within a predetermined schedule. The bag information path includes a 'process bag information' step 110 which performs activities such as the acquisition of the unique bag identifier and the inbound and outbound flight information discussed above. This is output by the process as 'processed bags' items 112 which are passed to the bag analyse process 100.

Similarly, the 'flight information' path includes a 'process flight information' step 114 which acquires the arrival and departure information for flights including scheduled, estimated and actual information as well as flight status, terminal (if appropriate), gate or stand data. The process outputs 'flight data' items 116 which are provided to the bag analysis process 100. The 'airport topology' input provides data items relating to the bag operation process 118, valid paths for bags through the airport 120 and station—airline rules 122. These are necessarily unique to each airport.

The analyse bag status process 100 outputs bag at risk data items 124 where the process indicates that a bag is in one of the at risk categories discussed above. This data is received by a process 'generate alerts and suggestions' 126 which sends at risk notifications to appropriate parts of the system and generates suggestions as to actions that can be taken to restore the bag status to cool. These suggestions and alerts are sent, at least, to the system administrator 128 which monitors the entire process and displays bags flagged as at risk at 130 together with reports 136 received from the process bag information process 110. The administrator may decide whether to act on the recommendation received from the process 126 or may decide on no action or alternative action. In another embodiment of the invention the suggestions may be implemented automatically but with the possibility of manual override by the administrator. A record of the decisions taken is kept at the administrator station indicated at 132 and the decision fed back to the bags at risk item 124.

The administrator receives messages direct from the bag information process 110. This can flag up invalid messages 134, such as unreadable license plates. These messages are processed by an 'analyse bag data quality' process 138 which outputs data quality statistics 140 to a report generator process 142.

Figure 5:
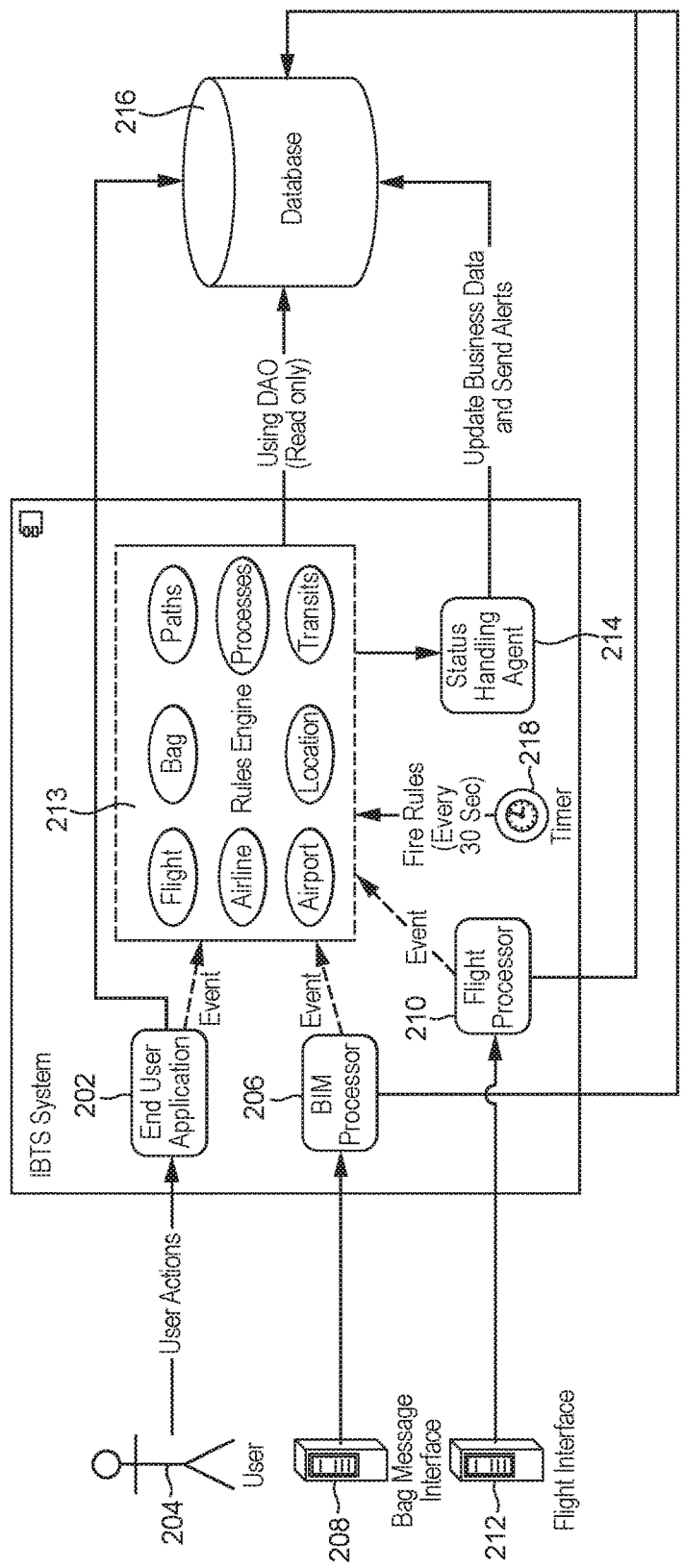
FIG. 5 is a schematic diagram of a physical implementation of the system of FIG. 4.

FIG. 5 shows the main physical components of the system components. The system may be implemented using conventional hardware components and is shown generally at 200. An end user application 202 is responsible for interaction with the end user, the administrator of FIG. 4, including display of flight and bag status. This can be implemented as thin or thick client. A bag information message processor 206 receives BIM messages from a bag message interface 208 and generates appropriate bag events to rules engine for status update. A flight processor 210 receives flight messages from a flight interface 212 and generates appropriate flight events to rules engine for status update.

A rules engine 213 interfaces with a database 216 which holds details of all bags in the system. The rules engine 213 maintains all bags in memory 216 and updates their status in response to an event, or lack of an event. The rules engine run rules relating to flights, bag, paths, airlines, processes, airports, locations and transits. The rules engine 213 communicates with a timer 128 which causes the rules engine to fire the rules at predetermined times, for example every 30 seconds. Finally, a status handling agent 214 receives bag status updates from rules engine and updates the data base.

The system defines the topology of a particular airport as a set of bag operation processes and valid paths. A bag operation process describes a valid entry criteria and a set of available paths. If one considers London Heathrow airport (LHR) as an example, an example process that can be applied at LHR is for all bags arriving by Air Canada at Terminal 1 and departing on Lufthansa at Terminal 2. A path is made up of activities, which includes one or more steps. Some activities are manual e.g. driving from point A to point B, while others are semi or fully automated e.g. scanning a bag bar code using a device or an automated reading of a bar code. Airport baggage handling systems generate a bag processing message each time the bag is read either by a bar code or RFID scan. The bag processing message is sent to the bag message interface 208 and then to the bag processor 206 which generates an event which is sent to the rules engine. The rules engine processes bag events and logically moves each bag along a known valid path. No event is generated for manual steps.

Figure 6:
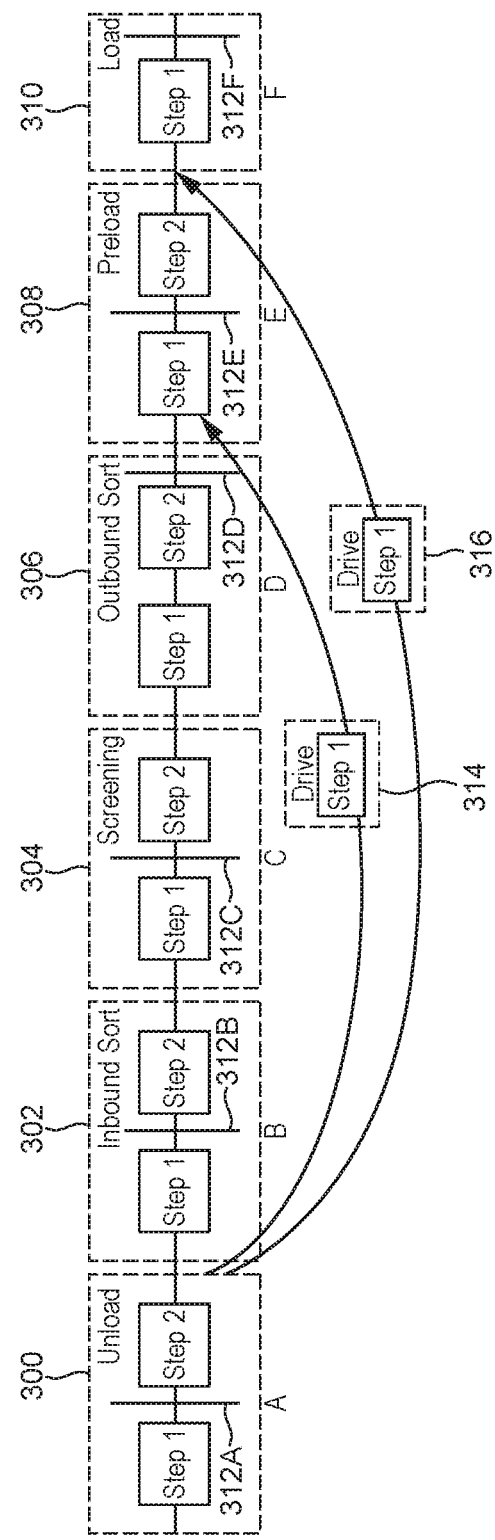
FIG. 6 shows an exemplary bag operation process.

FIG. 6 shows an example bag operation process. This bag operation process is made of the following activities: Unload 300, Inbound Sort 302, Screening 304, Outbound Sort 306, Preload 308 and Load 310. Each activity contains one are more steps. This is illustrated figuratively by each step comprising two steps except the load step 310 which has a single steps. Individual activities may comprise more than two steps. The vertical bar 312 A-F seen in the steps represents a scan point. This is the point where the bag tag bar code or RFID is scanned and where an IATA Bag Processed Message (BPM) event is generated and sent by the Baggage Handling System (BHS) to the baggage transfer system. Scanning can take place at any point in the step, and the figure shows scanning taking place either after the first activity of after the last. The bag operation process also includes two fast track paths 314, 316. These are alternative paths which can be adopted when a bag has been flagged as at risk to reduce the processing time for the bag. The first fast track path 314 takes a bag from the unloading activity to the preload activity and the second fast track path 316 takes the bag from the unload activity 310 straight to the aircraft for loading.

Figure 7:
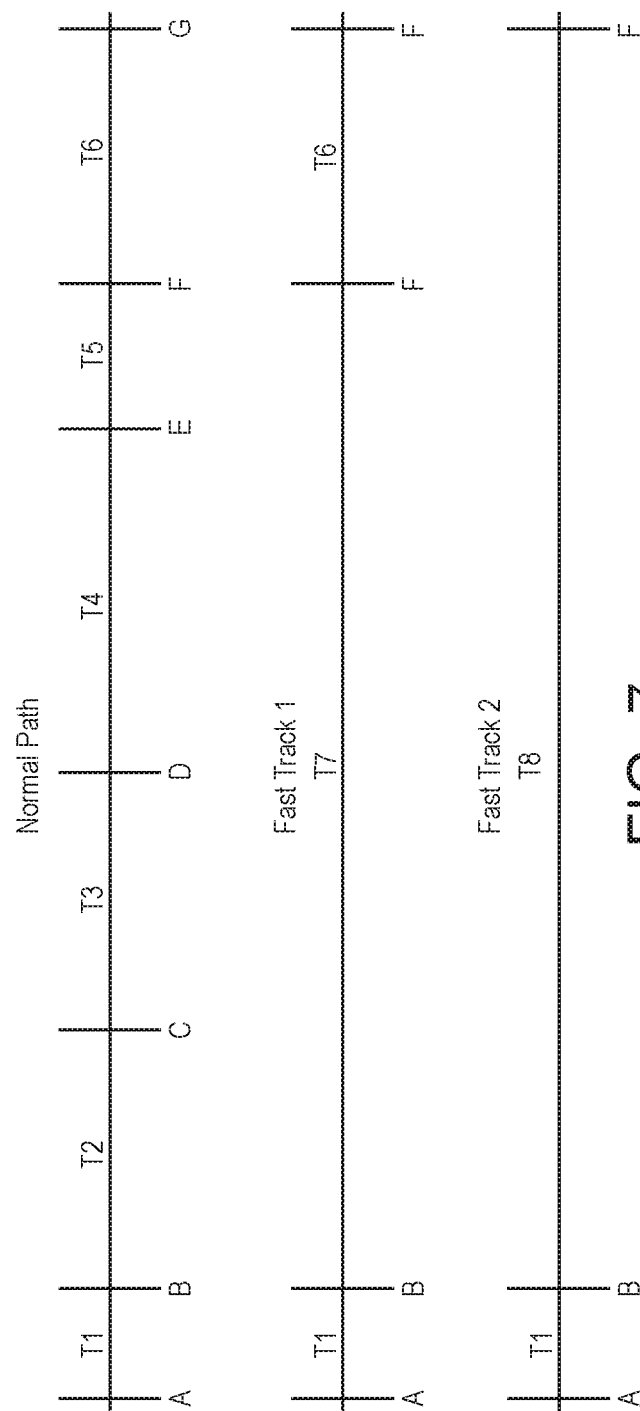
FIG. 7, illustrates how bags may be fast tracked depending on their status.

At system start-up, the Rules Engine 213 brings all configuration data into memory as facts. This includes Airline, Airport, Process, Path, Location, and Transit. The rules engine constantly looks for facts with matching criteria (rules), and takes appropriate action on them (update status). Configuration facts like Airline, Airports, Paths etc. are used only in decision making. Flight and Bag are business facts, whose status gets updated by rules engine as result of an event, or lack of received from the BIM processor 206 and flight processor 210. A transit is a special type of configuration fact that is constructed by the rules engine at start-up. The rules engine reads all processes, paths, activities, and steps, and creates a set of ordered transits for each path. Each transit has a start and end scan point, an average time required to complete the transit and its position in overall path. This is required as the rules engine can only react to events coming out of scan points. It doesn't need to know about intermediate manual activities. FIG. 7 shows the logical representation of paths using transits. The normal path is represented by T1 to T6 transits. Fast Track 1 (314 in FIG. 6) contains T1-T7-T8 transits and Fast Track 2 (316 in FIG. 6) is made of T1 and T8 transits. Transits are created by combining times of all activities and steps between two scan points. Each transit has a start and an end point, for example transit T7 has a start point at B and a finish point at E. A transit also stores the time required to move from start point to finish point.

Business facts relating to flights and bags come to memory 216 as result of BIM (Bag Information Messages) and FIM (Flight Information Messages) messages received via the bag message interface 208 and the flight interface 212. The BIM and Flight processor components 206, 210 convert incoming BIM and Flight messages into a rule engine event. Valid events are:
(i) New bag event
(ii) Bag location update event (iii) Bag deleted event
(iv) Bag process update event
(v) Bag rerouted event
(vi) New flight event
(vii) Flight schedule time update event
(viii) Flight actual time update event
(ix) Flight estimated time update event
(x) Flight status update event The rules engine 213 reacts to these events by creating or updating appropriate business facts and by firing a bag at risk and suggestion algorithm using matching rules as described below. The algorithm identifies the status of bags from the events and therefore those bags that are at risk and generates suggestions as to how the risk may be reduced and status moved to cool. Updated bag status and suggestions are stored in the database 216 using the status handling agent 214. A background task runs regularly, for example every 30 seconds to compute the "Bag Not Seen" status. The rules engine 213 can also treat a set of events as a group and infer meaning from it, for example, if it has been raining for the past 10 minutes, and bag unload is taking longer than usual, increasing threshold time.

Flight Message Processing

The system receives a continuous feed of flight information for active airports from the flight processor 212. Flight messages can be of two types: create and update. In response to create message, The system creates departure and arrival flights (per airport) in the rules engine. A flight is considered active once the terminal, gate and estimated time of departure/arrival are known.

Baggage Distribution Message Processing

The system also receives continuous a feed of bag information from Message Distribution Systems for active airports via the bag message interface 208. It can filter out any bags that are not for one of the active airline pair (inbound and outbound). If the departure and arrival flights for a bag are in active state, then it is assigned to a bag operation process and specified normal path for the process. Each bag operation process has associated attributes such as the identity of the arriving and departing airline, terminal, flight, transfer type, time of the day etc. Bag information is compared to all operation process attributes and a process with maximum number of matching attributes is selected. The bag is now considered active and is processed by the bag at risk and suggestion algorithm, where an appropriate status is assigned.

Bag at Risk and Suggestion Algorithm

By default, all bags inserted into the system have "Cold" status. The first task is to look at last seen location and assign current transit to the bag. The bag is then evaluated for the following 6 problems:

1. Bag Not Seen

This problem indicates that the bag is not where it is supposed to be at certain point of time. It is always calculated using the normal forward path as shown in FIG. 7. The system looks at average times for all transits on the normal path and creates a time forecast list for the bag for the complete path. Using this list, the system can tell when bag should reach its next scan point if it keeps moving along as expected. If a bag's last seen location does not match with current time, it is flagged as a "Bag Not Seen" bag. This evaluation is done for all bags loaded into the engine every 30 seconds (or at any configurable interval).

2. Bag Late

This problem indicates that a bag arrived late at a given point based on normal forward path described in "Bag Not Seen" section above. A bag will always go in Not Seen state before transitioning to Bag Late. A Bag Late problem can only be triggered by an incoming bag information message containing a new last seen location. The system compares the time the bag was seen at this location to an ideal time, and if the latter is less than the last seen time, the bag is marked as "Bag Late".

3. Bag Unexpected

This problem indicates that bag is last seen at a location which is not on any valid path for this bag operation process. The system determines this status by comparing the last seen location with all valid locations on all paths for this bag operation process. A Bag Unexpected problem can only be triggered by an incoming bag information message containing new last seen location.

4. Passenger Offloaded

This problem indicates that passenger will not be travelling and the bag is no longer due for this flight. It can only be triggered by a special bag marked for unload bag message.

5. Passenger Rerouted

This problem indicates that passenger has changed his/her mind and will travel on a different flight. A bag is no longer due on this flight and should be moved to new flight. This problem can only be triggered by an incoming bag information change message containing new flight. In this case, the system will remove the bag from the rules engine and will bring it back with new flight, which may mean new bag operation process and path. For example, if old flight was departing from terminal 1 and new one is going from Terminal 2, and assuming that bag is somewhere on T1, it will become bag unexpected, but since passenger is changing flight, the problem will become "Passenger Rerouted".

6. Bag on Wrong Flight

This problem indicates that bag has been loaded on wrong flight. It can only be triggered by an incoming bag information message containing new last seen location. When the system receives a bag loaded on aircraft or preloaded on a container destined for an aircraft message, it compares the departing flight to bag's original departing flight. If they are not same, the bag is marked as "Bag on wrong flight".

Any of the problems mentioned above can change the bag status to warm, hot, critical, or cool.

An alternative action is suggested if:

1. The problem is Bag Not Seen and status is warm, hot or critical. Since IBTS doesn't know the exact location of the bag, the suggestion will be to find the bag and take appropriate action.

2. The problem is Bag Late and status is hot or critical, in which case the system computes the next cheapest path from the last seen location to the departing flight, and suggest it to the user. It does so by identifying all other paths going from the finish point of the current transit to the destination location, and identifies one with cheapest resource. If the resource is time, then it will select the path with next highest time to the destination.

3. If the problem is Bag Unexpected, the status is critical, and the system will give a fixed suggestion to bring the bag to its expected Outbound Flight immediately.

4. If the problem is Passenger Offloaded, the system will inform user that Bag is no longer due on flight.

5. If the problem is Passenger Rerouted, and the new flight is not changing the bag operation process or valid paths, then no suggestion will be given, otherwise bag may fall under the special case of Bag Unexpected described above.

It is possible for a bag to become warm, hot or critical, and then recover itself because of human intervention or some other reason. In this case, bag will go to the cool state.

The system persists all data including flight and bag information on disks. When system is restarted, it finds all active flights in persistent store and brings them and their bags into the engine.

If information about bags is received before related flights are in active state, they are not sent to engine. This is because, without an active flight, the engine cannot associate bags to correct operation processes. Later, when the flight becomes active, all bags related to that flight come into engine, and normal process resumes.

When a flight departs i.e. actual time of departure is known, all bags with a last seen location of anything other than 'on aircraft' or 'preload' (depending on airport/airline configuration) are marked as "Mishandled". The suggestion in this case will be to reflight the bag. Bags are considered "Saved" if an alert was generated for them; a decision was made by user and bag made it to the flight and the status of the bag is then recorded as saved. If an alert was generated and bag made it to the flight without any human intervention the bag status is transferred to 'Miracle'. The system keeps bags and flight in the engine for additional period of time after flight departure, for example 60 minutes, to handle situations where bag loading information comes little after flight departure. This may happen if baggage agents do not have access to wireless network near aircraft.

If a flight is cancelled, all bags are marked as "No longer due" and removed from further processing.

Thus the embodiment described provides a decision support system which can assist airlines and ground handlers in reducing the quantity of mishandled bags. The system checks real-time Baggage Information Messages against real-time flight messages and customer defined airline/station/airport topology in order to determine whether a bag is at risk of becoming a mishandled bag, and provides a processing recommendation to mitigate the risk. Thus the embodiment provides a real-time analysis of the status of transfer baggage operations at an airport.

Many modifications to the embodiment described are possible and will occur to those skilled in the art. For example, the system may be used in conjunctions with rugged Hand Held Terminals and PDAs. In one alternative, reflighting may be facilitated and expedited by notifying a baggage tracing system about a mishandled bag in an automated manner as soon as it is flagged by IBTS as mishandled. Certain type of alerts may be notified by SMS or email to make messaging more direct and to speed up the response of parts of the system which are controlled by human operators.

When a bag is not seen at a current airport, an automatic check may be made with a baggage tracing system for a record of mishandling of bag at an up-line station. This step would improve the process of tracking down the exact location of the missing bag.

As mentioned above, the anticipated timings between each of the scanning locations are predetermined. These timings may be adjusted to react to particular local conditions but may also auto-adjust based on past trends.

To assist improvement of an airports performance, historical data is very important and the system may replay events to determine the status of bags at risk at a given date and time in the past.

To improve the usefulness of the system it may be integrated with a resource management system (RMS), to request automatically the allocation of a task to be executed by someone available in the area impacted.

In order to reflect better the conditions at any given time, weather forecasts and actual weather conditions may be used to generate additional alerts affecting schedule of inbound flights.

It should be noted that the range of recommendations that the system can provide is not confined to alternate paths only. The system can provide a wide range of recommendations for example, asking a baggage agent to go to the baggage makeup room and look for a bag on the ground and then put it back on the belt or sending someone to personally pick up a delayed bag and drive it to the next point on its normal path. In many cases the recommendation is for an alternate path but we can still recommend alternative recommendations as types of corrective actions.

It should also be noted that embodiments of the invention proactively flag bags which are at risk. This is thought to be a unique feature of embodiments of the invention. Other tools may provide similar information but only if the handler specifically looks for it through Bag inquiries. Given the way baggage handlers work in such a hectic environment, they have no time to run Baggage queries on a continuous basis and as such "reactive" information to them is not useful.

Many other variations and modifications are possible and will occur to those skilled in the art without departing from the scope of the invention which is determined by the following claims.

The invention claimed is:

1. A method of tracking passage of items from an arrival point to a departure point of an item handling system, comprising the steps of:
    acquiring information about the identity of one or more items, arrival and departure parameters for each of the items of the one or more items and a topology of a location through which each of the items may pass between arrival and departure;
    for a particular item of the one or more items, defining a path through the item handling system, the path including a plurality of checkpoints at which the particular item is identified and recorded;
    at a plurality of the checkpoints, determining a status of the particular item based on the time of arrival of the particular item at the checkpoint compared to a target time of arrival, and assigning a status from a plurality of statuses to the particular item, the plurality including a status indicating that the particular item is at risk of not arriving at a departure point by a required time; and
    where the particular item is assigned an at risk status, determining and communicating a suggested remedial action to a controller.

2. A method according to claim 1, wherein the one or more items comprise baggage.

3. A method according to claim 2, wherein the location is an airport and the departure point is a departure of the particular item of baggage on an outbound flight, wherein each item of baggage has a unique identifier, and wherein determining the status of the particular item comprises scanning the unique identifier at one of a plurality of scan locations and comparing a time at which the particular item is scanned to a time at which the particular item is expected to be scanned at that scanning location.

4. A method according to claim 3, wherein the unique identifier for each item of baggage comprises origin and destination airport codes.

5. A method according to claim 3, wherein the arrival and departure parameters comprise scheduled, estimated and actual flight arrival and departure times, arrival and departure gates.

6. A method according to claim 3, wherein the topology of the location comprises the topology of the airport and the step of defining the path through the item handling system comprises selecting a particular path from one of a plurality of stored possible paths through the airport baggage handling system, each path having been defined by identifying and listing process activities required to transfer the particular item of baggage from an arriving flight on a first airline at a first location at the airport to a departing flight on a second airline at a second location at the airport and assigning an average time for transit between activities for each path.

7. A method according to claim 3, wherein the at risk status assigned to the particular item of baggage is one of a plurality of risk statuses each indicating a different likelihood of the particular item of baggage failing to arrive at the departure point before the departure time.

8. A method according to claim 7, comprising, after the departure of a flight, for each item of baggage for that flight having the at risk status between the arrival and departure points, assigning a further status indicating whether or not each item of baggage having the at risk status was loaded onto the flight.

9. A method according to claim 8, wherein where the further status indicates that a certain item of baggage of each item of baggage having the at risk status was loaded onto the flight, indicating whether or not there was any intervention in the passage of the certain item of baggage through the baggage handling system.

10. A method according to claim 8, wherein the further status is recorded for subsequent analysis.

11. A method according to claim 1, wherein the suggested remedial action comprises defining an alternative path through the item handling system.

12. A method according to claim 1, wherein the suggested remedial action comprises locating the particular item.

13. A method according to claim 1, wherein the suggested remedial action comprises informing an owner of the particular item that the particular item is no longer due.

14. A system for tracking passage of items from an arrival point to a departure point in an item handling system, comprising:
  an item processor for acquiring and processing information about the identity of one or more items;
  an arrival and departure processor for acquiring and processing information about the arrival and departure parameters for a particular item of the one or more items;
  a rules engine operating on a topology of a location through which the particular item may pass between arrival and departure to define a path through the location for the particular item;
  a store for storing item identity data provided from the item processor, arrival and departure parameters provided from the rules engine, and location topology information;
  a user application for communicating data relating to arrival and departure parameters and one or more items to a system user; and
  a plurality of checkpoints arranged along a plurality of paths, each checkpoint including a scanner for scanning items to provide item identity and time of arrival information to the rules engine to determine a status of the particular item based on the time of arrival of the particular item at the checkpoint compared to a target time of arrival, the particular item being assigned one of a plurality of statuses by the rules engine, the plurality of statuses including a status indicating whether the particular item is at risk of not arriving at the departure point by a required time;
  wherein when the particular item is assigned an at risk status, the rules engine is configured to determine and communicate a suggested remedial action to the user.

15. A system according to claim 14, comprising a status agent communicating with the store and the rules engine for receiving item identity information updates and arrival and departure parameter updates from the rules engine and communicating those updates to the store.

16. A system according to claim 14, wherein the one or more items comprise baggage.

17. A system according to claim 16, wherein the location is an airport and the departure point is a departure of the particular item of baggage on an outbound flight, wherein each item of baggage has a unique identifier, and wherein the scanner at each checkpoint scans the one or more items of baggage to retrieve the unique identifier at one of a plurality of scan locations and communicate the identity to the rules engine together with a time of the scan, and the rules engine compares the time at which the particular item is scanned to a time at which the particular item is expected to be scanned at that scanning location.

18. A system according to claim 17, wherein the topology of the location comprises the topology of the airport and the rules engine determines a path through the handling system from the plurality of paths stored in the store, the path comprising a series of process activities required to transfer the particular item of baggage from an arriving flight on a first airline at a first location at the airport to a departing flight on a second airline at a second location at the airport and assigning and an average time for transit between activities for each path.

19. A system according to claim 17, wherein the at risk status assigned to the particular item of baggage by the rules engine is one of a plurality of risk statuses each indicating a different likelihood of the particular item of baggage failing to arrive at the departure point before the departure time.

20. A system according to claim 14, wherein the rules engine is configured to assign a recovered status to a bag when a subsequent checkpoint indicates that the bag is no longer at risk.

21. A system according to claim 20, wherein the rules engine is configured to assign, after the departure of a flight, for each item of baggage for that flight having an at risk status assigned between the arrival and departure points, a further status indicating whether or not the particular item was loaded onto the flight.

22. A system according to claim 21, wherein, the rules engine is configured, where the further status indicates that the particular item was loaded onto the flight, to indicate whether or not there was any intervention in the passage of the particular item through the baggage handling system.

23. A system according to claim 21, comprising a further store for storing the further status for subsequent analysis.

24. A system according to claim 14, wherein the suggested remedial action comprises an alternative path through the item handling system.

25. A system according to claim 14, wherein the suggested remedial action comprises locating the particular item.

26. A system according to claim 14, wherein the suggested remedial action comprises communicating to the owner of the particular item that the particular item is no longer due.

27. A method of tracking passage of items from an arrival point to a departure point in a hub and spoke item handling system, comprising the steps of:

defining a set of configuration data comprising a set of paths an item may take from the arrival point to the departure point, a set of processes the item must undergo in each path, each process comprising at least one step and an item scan to determine an identity of the item and a time at which it is scanned, and a set of transits for each path, each transit comprising a start and an end scan point, an average time between the start and end scan points and a position of the transit in the path;

acquiring event information relating to the item, the event information relating to the identity of the item, item scans, and its arrival and departure;

in response to event information, determining at a processor whether an item is at risk of failing to arrive at the departure point by a predetermined time and for any item determined to be at risk; and if an item is determined to be at risk, determining a remedial action for the item.

* * * * *